United States Patent [19]

Murase

[11] Patent Number: 4,536,526

[45] Date of Patent: Aug. 20, 1985

[54] METHOD OF MANUFACTURING POLYESTER FIBERS WITH GOOD ADHESION TO RUBBER

[75] Inventor: Shigemitsu Murase, Joyo, Japan

[73] Assignee: Unitika Ltd., Osaka, Japan

[21] Appl. No.: 317,667

[22] Filed: Nov. 2, 1981

[30] Foreign Application Priority Data

Nov. 26, 1980 [JP]   Japan .................................. 55-167173

[51] Int. Cl.$^3$ ............................................. C08G 59/06
[52] U.S. Cl. .................................... 523/433; 525/533; 252/8.7
[58] Field of Search ......................... 523/433; 525/533; 252/8.7

[56] References Cited

U.S. PATENT DOCUMENTS

| | | | |
|---|---|---|---|
| 3,525,703 | 8/1970 | Iwami et al. ......................... | 525/121 |
| 3,690,926 | 9/1972 | Wampetich et al. ............... | 524/114 |
| 4,029,621 | 6/1977 | Hartman et al. ..................... | 525/533 |
| 4,128,483 | 12/1978 | Ishida et al. ......................... | 252/8.7 |

Primary Examiner—Joseph L. Schofer
Assistant Examiner—N. Sarofim
Attorney, Agent, or Firm—Virginia S. Andrews

[57]   ABSTRACT

This invention is a method of manufacturing polyester fibers with good adhesion to rubber, characterized in that in the process of spinning polyester fibers, a spinning oil (finish composition) containing an ester of a thiodicarboxylic acid as the principal lubricating agent ingredient and an epoxy compound is added to the polyester fiber which is then heat treated.

16 Claims, No Drawings

METHOD OF MANUFACTURING POLYESTER FIBERS WITH GOOD ADHESION TO RUBBER

BACKGROUND OF THE INVENTION

This invention concerns a method of manufacturing polyester fibers with good adhesion to rubber, particularly by using a finish composition which contains an ester of a thiodicarboxylic acid and an epoxy compound, followed by heat treatment of the polyester fibers.

Polyester fibers such as polyethylene terephthalate, have excellent physical and chemical properties, are mass produced industrially and are widely used in various fields. They are also a very suitable material for reinforcing rubber.

However, polyester fibers have a great defect in that they are inferior in adhesion to rubber when compared to polyamide fibers such as nylon 6, nylon 6,6, etc., which are also typical industrial fibers.

Thus when polyamide fibers are simply treated with a resorcinol-formaldehyde-rubber latex (RFL) adhesive, they have good adhesion to rubber, but in the case of polyester fibers, even when this RFL treatment is performed, good adhesion cannot be obtained.

For this reason, many attempts have been made to improve the adhesion of polyester fibers to rubber. Typical methods for doing this are (1) when treating the raw cord textile with the RFL treatment (the so-called "dipping treatment"), it is first pretreated with an adhesive such as an epoxy compound, an isocyanate compound, an ethylene urea compound, etc., and then treated with RFL or RFL mixed with an esterophilic ingredient such as a novolak resin, or 2,6-bis(2',4'-dihydroxphenylmethyl)-4-chlorophenol, known by the trade name "Pexul"; and (2) an adhesive such as an epoxy compound, an isocyanate compound, etc., is added at the yarn stage, followed by dip-treating with RFL. Although the former method does give the desired adhesion to some degree, it has defects in that it requires a large quantity of adhesive, and the treatment method is troublesome, which tends to increase the cost. Although the latter method has the practical advantage that, like the polyamide fibers, the later dip treatment can be performed with RFL alone, it has the defect that the essential adhesive function is somewhat insufficient. Consequently, particularly in the latter method, a new problem is created that, in order to increase the adhesiveness, the method of treatihg the yarn itself must be performed under conditions which deviate greatly from the practical range: the concentration of the adhesive used in treating the yarn is markedly increased, the heat treatment conditions are made extremely severe, etc.

Many methods are already known for adding epoxy compounds when polyester fibers are spun. However, all of the previous methods have defects, e.g., (as mentioned above) their adhesive ability is not yet sufficient, or they require severe treatment conditions which greatly exceed what is practical; thus, they cannot be called satisfactory methods.

SUMMARY OF THE INVENTION

Against such a background, this invention makes possible the manufacturing of polyester fibers with good adhesion to rubber by the very simple method of adding the adhesive at the same time the spinning oil (finish composition) is added, when the polyester fiber is spun, and then heat-treating by using the heat treatment of the subsequent drawing process, after which only RFL treatment is performed.

This invention is characterized in that, in the process of spinning the polyester fiber, a spinning oil (finish composition) containing an ester of thiodicarboxylic acid as the principal lubricating agent ingredient and an epoxy compound is added to the polyester fiber which is then heat treated.

This invention solves the problems of the prior art by using a spinning oil (finish composition) containing an epoxy compound and an ester of thiodicarboxylic acid as the principal lubricating agent ingredient. By using this invention, not only is a high initial adhesive force obtained, but the permanent adhesion is also excellent, and even if the fiber is exposed to a hiqh temperature in the rubber, the adhesion is not greatly decreased. The reason why a high adhesive force is obtained is not clear, but it is believed to be because the lubricating agent, whose molecules contain sulfur, increases the affinity between the rubber and the epoxy compound.

Specifically, the ester of thiodicarboxylic acid referred to in this invention is an ester of a thiodicarboxylic acid such as thiodiacetic acid, thiodipropionic acid, thiodibutyric acid, thiodivaleric acid, or thiodilauric acid, and an alcohol such as aliphatic alcohols represented by methanol, propanol, lauryl alcohol, oleyl alcohol, etc., alicyclic alcohols represented by cyclopentanol, or cyclohexanol, etc., aromatic-ring-containing alcohols represented by benzyl alcohol or cinnamyl alcohol, etc., or derivatives of these, in which oxyalkylene has been added to these alcohols, etc. Among these, those which have a lubricating ability are used. The alcohols forming the ester with the thiodicarboxylic acid may be one, or a mixture of two or more, of these alcohols. Moreover, among these esters, those with total carbon numbers of 15–50 are preferable, from the viewpoint of the functioning of the oil in the spinning operation (lubricating ability, etc.).

The epoxy compound of this invention is ordinarily synthesized by the reaction of an epoxy compound containing a halogen, e.g., epichlorohydrin, and a polyhydric alcohol or polyhydric phenol. Examples of such polyhydric alcohols or phenols are polyhydric alcohols such as glycerol, ethylene glycol, diethylene glycol, propylene glycol, sorbitol, polyethylene glycol, polypropylene glycol, trimethylol propane, or their derivatives; and polyhydric phenols such as resorcinol, catechol, hydroquinone, or their derivatives. One may also use cyclohexane epoxide, diglycidyl ether, etc., obtained by oxidizing the unsaturated bonds with peracetic acid.

The spinning oil (finish composition) in this invention must contain an ester of a thiodicarboxylic acid as the principal lubricating agent ingredient; specifically, it is preferable for it to account for 80 weight percent or more of the lubricating agent ingredients. Moreover, besides this lubricating agent ingredient, one may use mineral oil, coconut oil, rapeseed oil, sperm oil, or other natural oils, or synthetic oils such as esters of higher alcohols or polyhydric alcohols and higher fatty acids, within the permitted limits. Furthermore, sufficient surfactant to emulsify and disperse the lubricating agent ingredients and, if desired, antistatic agents, heat-resisting agents, reaction accelerators (curing catalysts), coloring agents, etc., may be added. There is not necessarily any need to use a surfactant as an emulsifying and dispersing agent, but in general it is desirable to use a compound of castor oil or a higher alcohol to which an alkylene oxide has been added, polyethylene glycol, or an ester of polyethylene glycol and a higher fatty acid, etc. Of course, such a surfactant can also comprise the emulsifying and dispersing agent for the epoxy compound.

The proportion of the ingredients in the spinning oil (finish composition) should be 20-70 weight percent lubricating agent, 5-40 weight percent epoxy compound, 10-50 weight percent emulsifier, and suitable quantities of other additives to make a total of 100 weight percent.

If the proportions of the mixture are within these ranges, the original lubricating and adhering functions of the spinning oil (finish composition) will not be lost, and the increase in adhesion aimed for will be produced.

The "polyester" in this invention refers to a polycondensate of a compound with two ester-forming OH groups, typified by ethylene glycol, and a compound with two ester-forming carboxyl groups, typified by terephthalic acid; a typical example is polyethylene terephthalate. However, the polyester is not limited to homopolymers; copolymers are also possible, and compounds with three or more ester-forming groups may be used as copolymer ingredients, as long as they are within the range that will not hinder their fiber-forming ability.

The spinning process referred to is the process of spinning-winding-drawing-winding; of course, a spin-draw type of process, directly connecting the spinning and the drawing processes, may also be used. The spinning oil (finish composition) may be added at any desired stage of the operation by the roller, immersion, spray, or other methods. The spinning oil (finish composition) is used in the ordinary aqueous emulsion form, but it may also be used as a straight oil, diluted with low-viscosity mineral oil, etc., as long as dispersion and emulsification of the adhesive is possible. The addition of the oil (finish composition) may be performed two or more times; it is desirable for the total quantity of oil added to be 0.2-2 weight percent. Treatment with a spinning oil which lacks one or both of the lubricating agent and epoxy compound of this invention may be combined with treatment with the spinning oil (finish composition) of this invention. After adding the oil (finish composition), heat treatment is performed at 150-250° C. for a period of 0.05 to several seconds. The method of heat treatment may be hot plate, hot rollers, slit heater, oven, etc. This heat treatment may correspond exactly to the drawing process, i.e., the heat treatment conditions of the drawing process will become the heat treatment conditions required by this invention, without change. Thus, this invention may be said to be extremely practical. The simplest application of the method of this invention is to use the yarn-forming oil (finish composition) of this invention itself as the spinning oil (spin finish), and then to perform the normal hot drawing treatment. Thus, the composition of this invention has the great practical advantages that it can be applied as the spinning oil (spin finish) and that the severe heat treatment conditions of conventional methods are unnecessary.

Obviously the molecular weight, denier, filament number, cross-sectional shape, properties of the yarn material, fine structure, presence or absence of additives, and polymer properties (concentration of terminal carboxyl groups, etc.) are not limited in any way.

The polyester fibers obtained by the method of this invention will have extremely good adhesion to rubber merely upon application of the normal RFL treatment after twisting and weaving by the normal methods.

This increase in adhesion does not stop with an improvement of the polyester fiber itself, but is also directly connected with an improvement in the quality of the rubber product which is being reinforced, and thus has great practical value.

DESCRIPTION OF THE PREFERRED EMBODIMENT

This invention will be explained concretely by the actual examples given below. The measurement of intrinsic viscosity in the actual examples was performed in a mixed solvent of phenol and tetrachloroethane (1/1 weight ratio) at 20° C.

The measurement of the adhesive force with the rubber was performed by the following method. The original yarn was made into raw cord (twisting, twining together) which was made into dip cord (dip treatment), embedded in the rubber, and vulcanized, after which the adhesion between the cord and the rubber was measured.

In this process, the raw cord was made by twisting with a ring twisting machine at 40 twists/10 cm; two of these cords were twined together in the same manner at 40 twists/10 cm.

The dip treatment was performed under the following conditions.

| | |
|---|---:|
| Solution A | |
| Resorcinol | 15 Parts |
| Formaldehyde | 20 Parts |
| Caustic Soda | 0.4 Parts |
| Water | 290 Parts |
| Solution B | |
| Vinyl Pyridine-Butadiene-Latex Liquid (40 Percent) | 240 Parts |
| Butadiene-Styrene Latex (40 Percent) | 80 Parts |
| Water | 347 Parts |
| Solution A was cured at 25° C. for six hours; Solution B was cured at 25° C. for four hours. The two solutions were mixed, and again cured at 25° C. for twelve hours. | |
| Dipping Conditions | |
| Target Adhering Quantity (Solid Part) | 5 Percent |
| Drying Zone | 80° C. × 30 Seconds |
| Curing Zone (2 Chambers) | 230° C. × 80 Seconds × 2 Times |

The method of vulcanization was as follows. In an H-test mold, the dipped cord was embedded in unvulcanized rubber, the principal ingredients of which were 30 parts smoked sheet, 70 parts styrene-butadiene rubber, 40 parts carbon black, 5 parts zinc oxide, 1.5 parts stearic acid, 1 part phenyl-beta-naphthyl amine, 0.3 part anhydrous phthalic acid, 0.8 part vulcanization accelerator, 0.15 part diphenyl guanidine, and 2 parts sulfur. The rubber was vulcanized by heating at 140° C. for 40 minutes, and the adhesive treatment was performed.

The method of measuring the adhesive force was the "H-test method". The load required to pull out the cord embedded in rubber to a depth of 1 cm was measured.

ACTUAL EXAMPLE 1

Polyethylene terephthalate (PET) with an intrinsic viscosity of 0.95 was spun with an extruder-type melt spinner at a melting temperature of 290° C., a discharge quantity of 450 grams/minute, and a winding speed of 450 m/minute. In doing so, the eight spinning oils shown in Table 1 were added so that the quantity of effective ingredients that adhered was 0.9 weight percent, and the yarn was wound.

Next, the yarn was drawn and heat treated with a two-stage drawing machine composed of No. 1 rollers (100° C.), No. 2 rollers (100° C.), a hot plate (240° C.), No. 3 rollers (230° C.), and a winding roller. The time of passing over the hot plate was 0.2 second, the time of essential treatment by the No. 3 rollers 0.2 second, the total drawing ratio 6.0 fold, and the winding rate 200 m/minute. A PET fiber of 1500 denier/192 filament was obtained.

The fiber obtained was twisted and made into raw cord which was then dip-treated with RFL solution. The adhesion of this treated cord to rubber was measured. Results are shown in Table 2.

As is clear from Table 2, Examples Numbers 1–5 of this invention showed markedly greater adhesion than Comparative Examples Numbers 6–8. It is especially clear from the difference in the results of Examples Numbers 2 and 3 of this invention and Comparative Example No. 6 that this is due to the proportion of the lubricant containing an ester of thiodicarboxylic acid.

TABLE 1

| Number | 1 | 2 | 3 | 4 | 5 | 6 | 7 | 8 |
|---|---|---|---|---|---|---|---|---|
| Lubricants | | | | | | | | |
| Ester of Thiodipropionic Acid and Oleyl Alcohol | 40 | | 40 | 30 | | | | 50 |
| Ester of Thiodipropionic Acid and Lauryl Alcohol | | 40 | | | 30 | 30 | | |
| Oleyl Oleate | | | 10 | | | 10 | 40 | 10 |
| Emulsifiers | | | | | | | | |
| POE (20) Castor Oil | 20 | | 15 | 20 | 10 | | 20 | 20 |
| PEG (Molecular Weight 400) Monostearate | | 10 | 3 | | 20 | 20 | | 17 |
| POE (12) Hardened Castor Oil | 8 | 18 | | 15 | 5 | 8 | 10 | |
| Additives | | | | | | | | |
| Epikote 812 | 30 | 30 | | | 35 | 30 | | |
| Denacol EX-421 | | | 30 | 35 | | | 30 | |
| Other | | | | | | | | |
| m-Phenylene Diamine | | | 0.2 | | | 0.2 | | |
| Na Dioctyl Sulfosuccinate | 2 | 2 | 1.8 | | | 1.8 | | 3 |
| Total | 100 | 100 | 100 | 100 | 100 | 100 | 100 | 100 |

Notes:
(1) Proportions expressed in weight percent. When added, these oils were used as 20 percent aqueous emulsions.
(2) POE means polyoxyethylation; the figures in parentheses are the number of moles added.
(3) Epikote 812 is a trade name of the Shell Chemical Co. It is an epoxy compound with a diglycidyl ether of glycerin as the principal ingredient.
(4) Denacol EX-421 is a trade name of Nagase and Company, Ltd. It is an epoxy compound with a triglycidyl ether of diglycerin as the principal ingredient.
(5) Numbers 1–5 are examples of this invention. Numbers 6–8 are comparative examples.

TABLE 2

| Number | Adhesion (kg/cm) | Notes |
|---|---|---|
| 1 | 17.8 | Example of this invention |
| 2 | 17.5 | Example of this invention |
| 3 | 17.6 | Example of this invention |
| 4 | 17.8 | Example of this invention |
| 5 | 17.4 | Example of this invention |
| 6 | 14.3 | Comparative example |
| 7 | 14.9 | Comparative example |

TABLE 2-continued

| Number | Adhesion (kg/cm) | Notes |
|---|---|---|
| 8 | 7.6 | Comparative example |

ACTUAL EXAMPLE 2

A PET spun yarn with an intrinsic viscosity of 0.90 was fed, without winding, directly to a spindraw apparatus composed of No. 1 rollers (with separating rollers attached), No. 2 rollers (Nelson rollers, 150° C.), No. 3 rollers (Nelson rollers, 200° C.), No. 4 rollers (Nelson rollers, 210° C.), and No. 5 rollers (with separating rollers attached, 230° C.). It was drawn in two stages, a total of 6.0 fold, and finally wound at a rate of 1000 m/minute. A 1500 denier/192 filament PET fiber was produced. In this process, a straight oil composed principally of low viscosity mineral oil, coconut oil, etc., was added at 0.5 weight percent and, in addition, the oils Number 2 and Number 7 of Actual Example 1 were added between the No. 4 rollers and the No. 5 rollers, each oil at 1.0 weight percent, and heat treatment was performed for 1 second with the No. 5 rollers. The adhesion to rubber of the fibers obtained were 16.2 kg/cm with the No. 2 oil and 13.0 kg/cm with the No. 7 oil. Thus, the superiority of the former, an example of this invention, was evident.

I claim:
1. A finish composition for polyester fiber to improve adhesion to rubber comprising
(a) about 20 to 70 weight percent of a lubricant which comprises at least 80 weight percent of an ester of thiodicarboxylic acid,

(b) about 5 to 40 weight percent of an epoxy compound, and (c) about 10 to 50 weight percent of a surfactant.

2. The composition of claim 1 wherein the epoxy compound is synthesized by the reaction of an epoxy compound containing a halogen with an alcohol or phenol.

3. The composition of claim 2 wherein the epoxy compound containing a halogen is epichlorohydrin.

4. The composition of claim 1 wherein the epoxy compound is selected from the group consisting of compounds having double bond oxidized with peracetic acid, the reaction product of epichlorohydrin with a polyhydric alcohol, and the reaction product of epichlorohydrin with a polyhydric phenol.

5. The composition of claim 1 wherein the ester of thiodicarboxylic acid has a total carbon number of 15-50.

6. The composition of claim 1 wherein the ester is made from an ester of a thiodicarboxylic acid and an alcohol.

7. The composition of claim 6 wherein the thiodicarboxylic acid is selected from the group consisting of thiodiacetic acid, thiodipropionic acid, thiodibutyric acid, thiodivaleric acid and thiodilauric acid.

8. The composition of claim 6 wherein the alcohol is selected from the group consisting of (a) an aliphatic alcohol selected from the group consisting of methanol, propanol, lauryl alcohol and oleyl alcohol;

(b) an alicyclic alcohol selected from the group consisting of cyclopentanol and cyclohexanol;

(c) an aromatic-ring-containing alcohol selected from the group consisting of benzyl alcohol and cinnamyl alcohol;

(d) derivatives of the foregoing to which oxyalkylene has been added; and (e) mixtures of two or more of the foregoing.

9. The composition of claim 6 wherein the ester is made from an ester of thiodipropionic acid and oleyl alcohol.

10. The composition of claim 6 wherein the ester is made from an ester of thiodipropionic acid and lauryl alcohol.

11. A method for producing polyester fiber with improved adhesion to rubber comprising (i) applying to the fiber a finish composition comprising
  (a) about 20 to 70 weight percent of a lubricant which comprises at least 80 weight percent of an ester of thiodicarboxylic acid,
  (b) about 5 to 40 weight percent of an epoxy compound, and
  (c) about 10 to 50 weight percent of a surfactant, and (ii) heating the fiber at a temperature of about 150-250° C. for up to several seconds.

12. The method of claim 11 wherein the heating is for 0.05 to several seconds.

13. The method of claim 12 wherein the heating is for 0.4 to 1 second.

14. The method of claim 11 wherein the finish composition is applied during spinning of the fiber.

15. The method of claim 11 wherein the finish composition is applied after the fiber has been drawn.

16. The method of claim 11 wherein about 0.2 to 2 percent, based on the weight of the fiber, of the finish composition is applied.

* * * * *